(12) United States Patent
Sugihara et al.

(10) Patent No.: US 10,030,596 B2
(45) Date of Patent: Jul. 24, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Hiroyuki Sugihara, Suntou-gun (JP); Kaoru Otsuka, Mishima (JP); Shinji Sadakane, Susono (JP); Noriyasu Adachi, Numazu (JP); Shigehiro Sugihira, Susono (JP); Keisuke Sasaki, Susono (JP); Takayoshi Kawai, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/784,567

(22) Filed: Oct. 16, 2017

(65) Prior Publication Data

US 2018/0163654 A1  Jun. 14, 2018

(30) Foreign Application Priority Data

Dec. 8, 2016 (JP) .................. 2016-238466

(51) Int. Cl.
  *F01L 13/00* (2006.01)
  *F02D 41/06* (2006.01)
  *F02D 13/02* (2006.01)
  *F02D 41/00* (2006.01)

(52) U.S. Cl.
  CPC ........ *F02D 41/062* (2013.01); *F01L 13/0036* (2013.01); *F02D 13/0238* (2013.01); *F01L 2013/0052* (2013.01); *F01L 2013/0078* (2013.01); *F01L 2800/11* (2013.01); *F01L 2800/12* (2013.01); *F02D 2041/001* (2013.01)

(58) Field of Classification Search
  CPC ....... F01L 1/267; F01L 13/0036; F01L 13/08; F01L 2013/0052; F01L 2013/0078; F01L 2800/01; F01L 2800/11; F01L 2800/12; F02D 41/062; F02D 2041/001
  USPC ..... 123/90.15–90.18, 179.16, 179.18, 182.1, 123/405
  See application file for complete search history.

(56) References Cited

U.S. PATENT DOCUMENTS

| 2005/0204805 A1* | 9/2005 | Wakahara ................. F01L 1/34 73/114.72 |
| 2006/0102125 A1* | 5/2006 | Mashiki .................. F01L 1/344 123/179.4 |

(Continued)

FOREIGN PATENT DOCUMENTS

| JP | 2009-228543 A | 10/2009 |
| JP | 2010-168966 A | 8/2010 |

*Primary Examiner* — Erick Solis
(74) *Attorney, Agent, or Firm* — Sughrue Mion, PLLC

(57) ABSTRACT

In starting the engine, if it is determined that large cams are not completely prepared for all driving cams, valve closing timings of all intake valves are changed by driving the VVT so that all of the cylinders have equal in-cylinder filling efficiency. A fuel injection amount of each cylinder is determined by a feedforward control assuming that the large cams are completely prepared for all of the driving cams. When the valve closing timing of all of the intake valves are changed by driving the VVT to equalize the in-cylinder filling efficiencies of all of the cylinders, all of the cylinders have substantially equal in-cylinder air-fuel ratios.

3 Claims, 8 Drawing Sheets

(56) References Cited

U.S. PATENT DOCUMENTS

| | | | | |
|---|---|---|---|---|
| 2006/0102127 A1* | 5/2006 | Izumi | .................. | F02D 13/0226 |
| | | | | 123/179.18 |
| 2006/0207535 A1* | 9/2006 | Hiyoshi | .............. | F01L 1/34403 |
| | | | | 123/90.16 |
| 2007/0056565 A1* | 3/2007 | Fuwa | .................. | F01L 13/0063 |
| | | | | 123/481 |
| 2009/0222196 A1* | 9/2009 | Cinpinski | ................. | F01L 1/34 |
| | | | | 701/105 |
| 2009/0288480 A1* | 11/2009 | Noda | ..................... | F01L 1/344 |
| | | | | 73/114.79 |
| 2010/0235067 A1* | 9/2010 | Nomura | .................. | F01L 1/344 |
| | | | | 701/103 |
| 2013/0206105 A1* | 8/2013 | Ando | ...................... | F01L 1/34 |
| | | | | 123/348 |
| 2017/0114676 A1* | 4/2017 | Verner | ..................... | F01L 9/04 |

* cited by examiner

LIVC: IVC OF LARGE CAM WHEN LARGE AND SMALL CAMS ARE USED
EIVC: IVC OF SMALL CAM WHEN LARGE AND SMALL CAMS ARE USED

Fig. 4

| | #1 | #2 | #3 | #4 |
|---|---|---|---|---|
| IN NORMAL ENGINE START (LARGE CAMS FOR ALL CYLINDERS (=STARTING CAMS)) | NORMAL IVO / NORMAL IVC / BDC | SAME AS ON THE LEFT | SAME AS ON THE LEFT | SAME AS ON THE LEFT |
| IN STARTING ENGINE USING LARGE AND SMALL CAMS (#1/#2 LARGE CAMS, #3/#4 SMALL CAMS) | IVC OF LARGE CAM WHEN LARGE AND SMALL CAMS ARE USED / BDC / IVO WHEN LARGE AND SMALL CAMS ARE USED | SAME AS ON THE LEFT | IVO WHEN LARGE AND SMALL CAMS ARE USED / BDC / IVC OF SMALL CAM WHEN LARGE AND SMALL CAMS ARE USED | SAME AS ON THE LEFT |

CONTROL DEVICE FOR INTERNAL COMBUSTION ENGINE

CROSS-REFERENCE TO RELATED APPLICATION

The present disclosure claims priority under 35 U.S.C. § 119 to Japanese Patent Application No. 2016-238466, filed on Dec. 8, 2016. The contents of this application are incorporated herein by reference in their entirety.

BACKGROUND

Technical Field

The present disclosure relates to a control device for an internal combustion engine.

Background Art

JP 2009-228543 A discloses a variable valve device for a multi-cylinder engine in which two types of intake cams having different lift amounts are used for driving an intake valve of each cylinder. In the valve device, the two types of intake cams are carried by a cam carrier. The cam carrier is slidably provided in an axial direction of a cam shaft. When the cam carrier slides in the axial direction of the cam shaft, the intake cams are switched therebetween to change the lift amount of the intake valve.

In the valve device, the cam carrier is provided for each cylinder group. Therefore, when the cam carrier slides in the axial direction of the cam shaft, the intake cams provided for the cylinders belonging to the cylinder group are switched at one time. The valve device makes it possible to cut down the number of component parts for driving the intake valve and to reduce the cost as compared with a case where the cam carrier is provided for each cylinder.

JP 2010-168966 A discloses an engine start control with a valve device in which one type of intake cam is continuously changeable in a lift amount and an operation angle. This start control is performed for increasing the lift amount of the intake valve to a predetermined value or more when the engine is restarted after automatic stop of the engine. JP 2010-168966 A also discloses an example of the start control for driving the valve device in which the lift amount of the intake cam is maximum immediately before the automatic stop of the engine. This start control makes it possible to reduce the power consumption as compared with a case where the valve device is driven after the automatic stop of the engine.

In the multi-cylinder engine provided with the intake cams in which the cam profiles such as a lift amount and an operation angle are changed, it is desirable that the cam profiles of all the intake cams of all the cylinders become a suitable cam profile for starting the engine (hereinafter, also referred to as a "starting profile") when the engine is started. In other words, it is desirable that the cam profiles of all the intake cams are switched to the starting profile before the engine is started.

The start control of JP 2010-168966 A enables cam profiles of all the intake cams to be switched to the starting profile before the engine is started. However, the switching to the starting profile is not necessarily successful. If the switching fails, the combustion in a cylinder corresponding to the intake cam which failed in the switching is not appropriately performed, and the engine start-up performance may be reduced. Therefore, the technology development is required to appropriately solve such problem.

The present disclosure addresses the above problem, and an object of the present disclosure is to take technical measures when cam profiles of all the intake cams of all the cylinders are not switched to the suitable profile for starting the engine before the engine starts.

SUMMARY

A first aspect of the present disclosure provides a control device for controlling an internal combustion engine.

The engine comprises multiple cylinder and intake cams which are provided for each cylinder and also configured to drive an intake valve of each cylinder by changing at least one of a lift amount and an operation angle of a cam profile of each intake cam.

The control device is configured to:
when the engine is started, determine whether the cam profiles of all the intake cams are switched to a suitable cam profile for starting the engine; and
when it is determined that the cam profiles of all the intake cams are not switched to the suitable profile for starting the engine, perform an engine start control in which an in-cylinder air amount or a fuel injection amount is adjusted so that in-cylinder air-fuel ratios of all the cylinders are equalized.

A second aspect of the present disclosure provides the control device according to the first aspect,
wherein the engine further comprises a cam shaft which is configured to support the intake cams and a rotational phase change mechanism which is configured to change a rotational phase of the cam shaft with respect to a crankshaft, and
wherein the engine start control is a control in which fuel injection amounts of all the cylinders are set to be equal values whereas the rotational phase change mechanism is operated to adjust in-cylinder air amount of all the cylinders so that in-cylinder filling efficiencies of all the cylinders are equalized.

A third aspect of the present disclosure provides the control device according to the first aspect,
wherein the engine start control is a control in which the in-cylinder air amounts of all the cylinders are estimated and the fuel injection amounts of all the cylinders are adjusted based on the estimated in-cylinder air amounts.

According to the first to third aspects, even when cam profiles of all the intake cams are not switched to the suitable profile for starting the engine when the engine is started, the in-cylinder air-fuel ratios of all the cylinders can be equalized. Therefore, the in-cylinder air-fuel ratios of all the cylinders fall within an air-fuel ratio range in which the engine can be started, and thereby the engine can be appropriately started.

BRIEF DESCRIPTION OF DRAWINGS

FIG. 4 is a diagram illustrating an example of a combination of determination results of driving cams and valve opening and closing timings of the intake valve when an engine is started;

DESCRIPTION OF EMBODIMENTS

Figure 1:
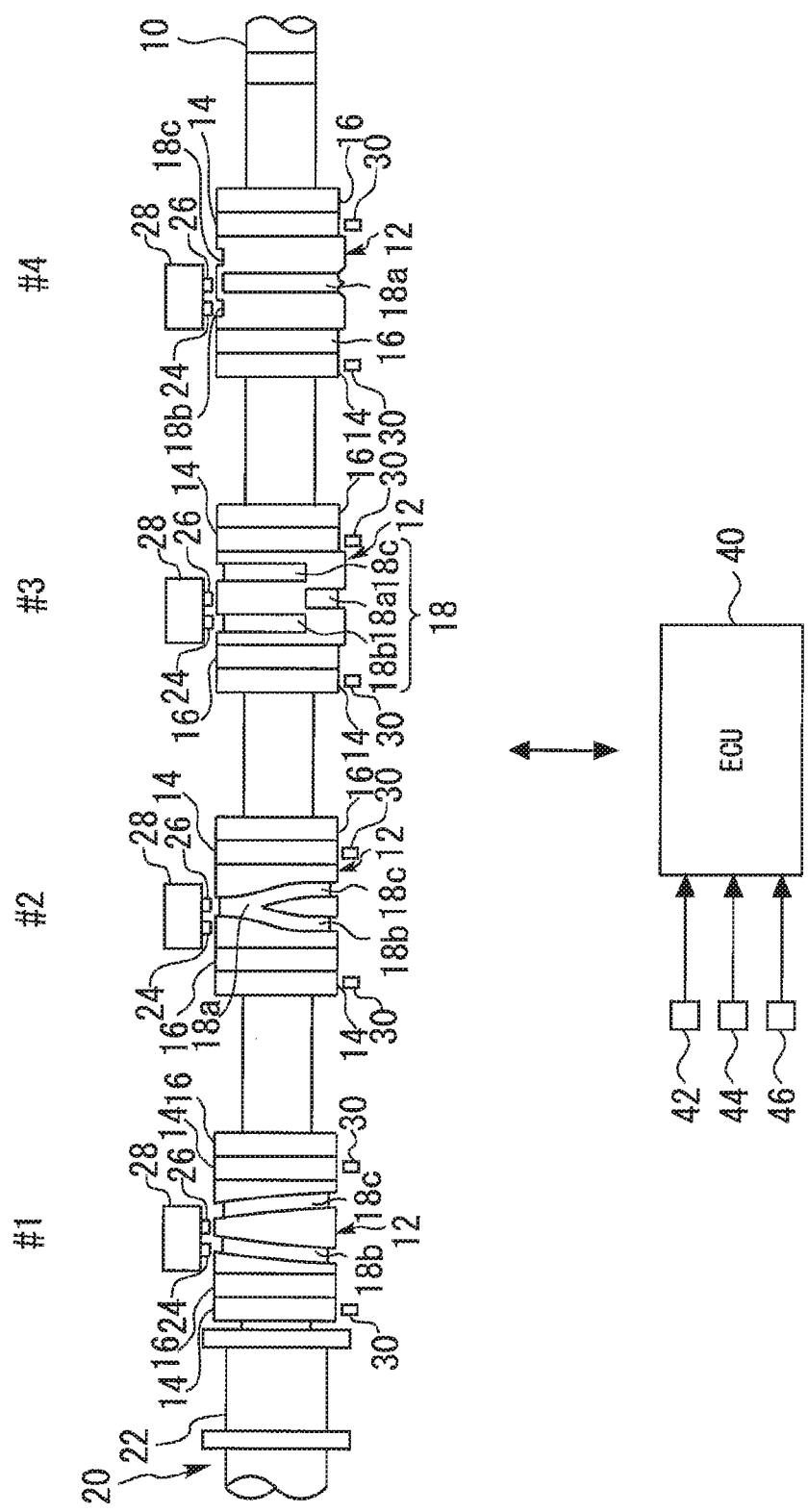
FIG. 1 is a schematic diagram illustrating a configuration example of a system according to a first embodiment of the present disclosure.

Hereinafter, embodiments of the present disclosure will be described based on the drawings. Note that the common elements in each drawing are assigned the same reference numerals, respectively, and the duplicate description is omitted.

First Embodiment

Firstly, a first embodiment of the present disclosure will be described with reference to FIGS. 1 to 6.
[Description of System Configuration Example]
FIG. 1 is a schematic diagram illustrating a configuration example of a system according to the first embodiment of the present disclosure. A valve system illustrated in this figure includes a cam shaft 10 for an inline four-cylinder engine mounted on a vehicle. The cam shaft 10 is connected with a crankshaft (not illustrated), and is rotated in synchronism with the crankshaft. Four cam carriers 12 are arranged at intervals on the cam shaft 10, each of the cam carriers having a hollow shaft formed therein. The cam carriers 12 are slidably arranged in an axial direction of the cam shaft 10 while being fixed in a rotational direction of the cam shaft 10. The cam carrier 12 includes two types of intake cams 14 and 16 that have different profiles (profile means at least one of a lift amount and an operation angle, the same shall apply hereinafter), the intake cams 14 and 16 being provided adjacently to each other.

In the first embodiment, the intake cam 14 has an operation angle and a lift amount that are smaller than those of the intake cam 16, for example. Hereinafter, the intake cam 14 and the intake cam 16 are also called as a "small cam 14" and a "large cam 16," respectively, for the convenience of description. Two pairs of small and large cams 14 and 16 are provided for each cylinder, because two intake valves are disposed for each cylinder. In the present disclosure, the number of intake valves per cylinder may be one, or three or more.

A surface of the cam carrier 12 has a groove 18 formed thereon and spirally extending while rotating in the axial direction of the cam shaft 10. The grooves 18 respectively provided on the cam carriers are formed with a phase difference among the cylinders. Specifically, the phase difference of 90° is provided between the groove 18 for a first cylinder #1 and the groove 18 for a third cylinder #3, between the groove 18 for the third cylinder #3 and the groove 18 for a fourth cylinder #4, between the groove 18 for the fourth cylinder #4 and the groove 18 for a second cylinder #2, and between the groove 18 for the second cylinder #2 and the groove 18 for the first cylinder #1. The groove 18 for each cylinder is branched in two from midway. Hereinafter, to particularly distinguish parts of the groove 18, a part before branching of the groove 18 is denoted as a groove 18a, and parts after branching of the groove 18 are denoted as grooves 18b and 18c.

A variable valve timing mechanism (hereinafter referred to as "VVT") 20 is provided to the cam shaft 10. The VVT 20 is a mechanism that changes a valve opening characteristic of the intake valve by changing a rotational phase difference of the cam shaft 10 with respect to the crankshaft. The VVT 20 includes: a housing 22 that is coupled to the crankshaft via a timing chain, or the like; and a vane body that is provided in the housing 22 and attached to an end of the cam shaft 10.

A hydraulic pressure is supplied to a hydraulic chamber partitioned by the housing 22 and the vane body so that the vane body is relatively rotated to the housing 22, thereby further enabling the rotational phase difference of the cam shaft 10 with respect to the crankshaft to be changed. The hydraulic pressure supplied to the VVT 20 is controlled by a hydraulic pressure control valve provided in a hydraulic pressure supply line. A mechanism of the VVT 20 is known, and the present disclosure does not limit the configuration of the VVT 20. Therefore, further description about the VVT 20 is omitted.

The valve system illustrated in FIG. 1 includes a solenoid 28 having two pins 24 and 26 for each cylinder. The solenoid 28 is an actuator that drives the pins 24 and 26 by an electromagnetic force, the pins 24 and 26 serving as magnetic bodies. When the pin 24 (or the pin 26) is protruded from the solenoid 28, the pin 24 (or the pin 26) is inserted into the groove 18 so as to be engaged with each other. When the pin 24 (or the pin 26) inserted into the groove 18 is retracted into the solenoid 28, the pin 24 (or the pin 26) is removed from the groove 18 so that the engagement between them is released.

Hereinafter, when there is particularly no need to distinguish between the pins 24 and 26, the pins 24 and 26 are simply referred to as "pins."
[Description of Switching Operation Example of Intake Cams]
FIGS. 2A to 2D each are a diagram for describing an example of a rotational operation of the cam carrier 12 by engagement between the pin 24 and the groove 18.

Figure 2A:
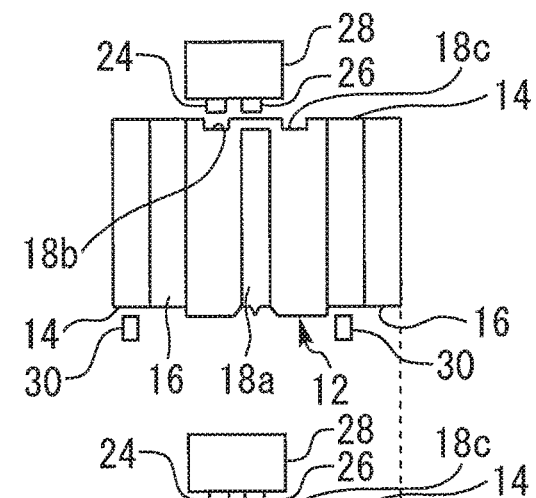
FIGS. 2A to 2D each are a diagram for describing an example of a rotational operation of a cam carrier 12 by engagement between a pin 24 and a groove 18 illustrated in FIG. 1.

In FIGS. 2A to 2D, assume that the cam carrier 12 is rotated from an upper side to a lower side. For the convenience of description, FIGS. 2A to 2D each illustrate only the cam carrier 12 and the solenoid 28, and rocker arm rollers 30 that come into contact with the small cam 14 and the large cam 16. In FIG. 2A, both of the pins 24 and 26 are retracted into the solenoid 28. The pin 24 is positioned to face the groove 18b, whereas the pin 26 is positioned to face a part of the cam carrier 12 where the groove 18 is not formed.

Figure 2B:
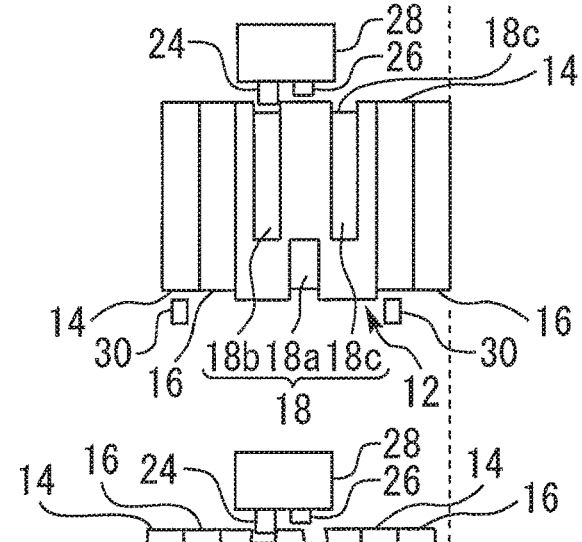

FIG. 2B illustrates a posture of the cam carrier 12 that is rotated by 90° from a state illustrated in FIG. 2A. As being understood by a comparison between FIG. 2B and FIG. 2A, when the cam carrier 12 is rotated, the groove 18a is moved to a back side of the cam carrier 12, whereas the grooves 18b and 18c are moved to a front side of the cam carrier 12. The grooves 18b and 18c illustrated in FIG. 2B are orthogonal to the shaft of the cam carrier 12. Hereinafter, the parts of the grooves 18b and 18c illustrated in FIG. 2B are also referred to as "orthogonal parts." In FIG. 2B, the pin 24 is protruded from the solenoid 28. The pin 24 is protruded while the orthogonal part of the groove 18b faces the pin 24. The pin 24 protruded from the solenoid 28 is smoothly inserted into the orthogonal part of the groove 18b and engaged with the groove 18b.

Figure 2C:
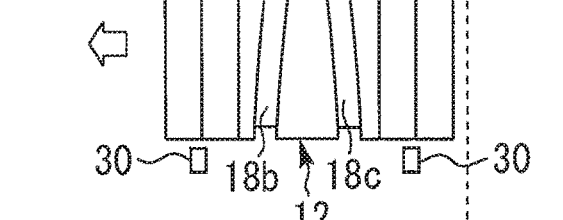

FIG. 2C illustrates a posture of the cam carrier 12 that is rotated by 90° from a state illustrated in FIG. 2B. As being understood by a comparison between FIG. 2C and FIG. 2B, when the cam carrier 12 is rotated, the whole area of the groove 18a is completely moved to the back side of the cam carrier 12, whereas the grooves 18b and 18c are further moved to the front side of the cam carrier 12. The grooves 18b and 18c illustrated in FIG. 2C are inclined with respect to the shaft of the cam carrier 12.

Hereinafter, the parts of the grooves 18b and 18c illustrated in FIG. 2C are also referred to as "inclined parts." As being understood by a comparison between FIG. 2C and FIG. 2B, the cam carrier 12 is slid in a left direction, because the pin 24 in the engagement state with the groove 18b is moved along the inclined part of the groove 18b.

Figure 2D:
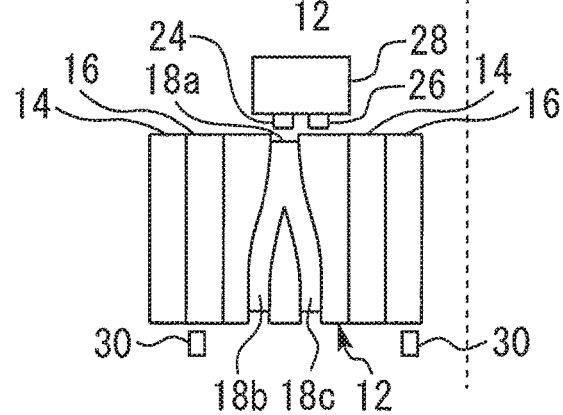

FIG. 2D illustrates a posture of the cam carrier 12 that is rotated by 90° from a state illustrated in FIG. 2C. As being understood by a comparison between FIG. 2D and FIG. 2C, when the cam carrier 12 is rotated, the inclined parts of the grooves 18b and 18c are moved to the back side of the cam carrier 12, whereas the groove 18a is moved to the front side of the cam carrier 12. In FIG. 2D, the pin 24 is retracted into the solenoid 28. The pin 24 is retracted after the pin 24 is moved from the groove 18b to the groove 18a. Therefore, the retracted pin 24 is smoothly removed from the groove 18a.

As being understood from FIGS. 2A to 2D, when the cam carrier 12 is slid in the left direction, the cam with which the rocker arm roller 30 comes into contact is switched from the small cam 14 to the large cam 16.

The switching operation from the large cam 16 to the small cam 14 is performed as follows. The cam carrier 12 is further rotated from the state illustrated in FIG. 2D, and the pin 26 is protruded from the solenoid 28 at a timing when the pin 26 faces the groove 18c. Thus, the pin 26 is inserted into the groove 18c. The pin 26 in the engagement state with the groove 18c is moved along the orthogonal part and the inclined part of the groove 18c, and the cam carrier 12 is slid in a right direction. When the pin 26 is retracted into solenoid 28 after the pin 26 is moved from the groove 18c to the groove 18a, the pin 26 is removed from the groove 18a. Accordingly, the cam with which the rocker arm roller 30 comes into contact is switched from the large cam 16 to the small cam 14.

Referring back to FIG. 1, the system configuration example is continuously described. The system illustrated in FIG. 1 includes an ECU 40 as a control device. The ECU 40 includes a RAM (random access memory), a ROM (read only memory), a CPU (microprocessor), and the like. The ECU 40 receives and processes signals from various sensors mounted on a vehicle. The various sensors include at least a crank angle sensor 42 that outputs a signal in accordance with a rotation angle of the crankshaft, an acceleration position sensor 44 that outputs a signal in accordance with a stepping amount of an accelerator pedal, and an ignition key 46 that outputs a signal for starting an engine (IG signal). The ECU 40 processes the signals received from the various sensors, and operates various actuators in accordance with a predetermined control program. The various actuators include a fuel injection valve, an ignition device, a throttle valve, and the like in addition to the above-described hydraulic pressure control valve of the VVT 20 and the solenoid 28.

[Cam Switching Control]

In the first embodiment, the small cams 14 are mainly used to drive the intake valves during the normal operation of the engine. However, the large cams 16 are surely used to drive the intake valves when the engine is started. In the first embodiment, it is determined whether all of the intake cams facing the rocker arm rollers 30 (hereinafter, also referred to as "driving cams") are the large cams 16 when the engine is stopped. When it is determined that all of the driving cams are not the large cams 16, the switching operations are performed by driving the solenoid 28 as described in FIGS. 2A to 2D when the engine is stopped.

As described in FIGS. 2A to 2D, the driving cams are switched by driving the solenoid 28 in each cylinder. Therefore, if a period from an engine stop to an engine restart is extremely short, the switching to the large cam 16 may not be completed in some cylinders. Even if there is sufficient time when the engine is stopped, the switching to the large cam 16 may fail in some cylinders. Thus, since the large cams 16 are not completely prepared for all of the driving cams when the engine is started, both of the large cams 16 and the small cams 14 are to be used as the driving cams.

When the large cams 16 are not completely prepared for all of the driving cams, a difference occurs in an in-cylinder air amount among the cylinders. However, if fuel is injected into the cylinder by an amount determined assuming that the large cams 16 are completely prepared for all of the driving cams when the engine is started, an air-fuel ratio of a cylinder in which the driving cams are still the small cams 14 is deviated from a target air-fuel ratio. Furthermore, if the air-fuel ratio of a cylinder in which the driving cams are still the small cams 14 is largely deviated from an air-fuel ratio range in which the engine can be started, the engine is not appropriately started.

[Characteristic of Control in First Embodiment]

Figure 3:
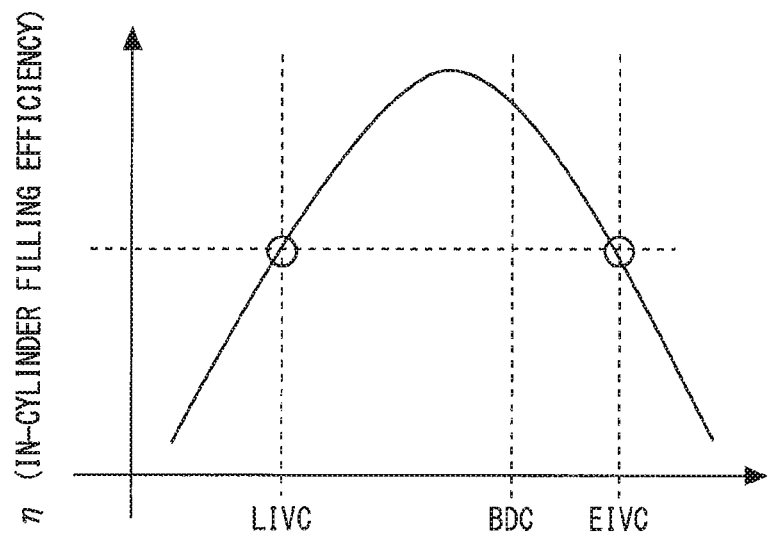
FIG. 3 is a graph showing an example of a relationship between a valve closing timing of an intake valve IVC and an in-cylinder filling efficiency r.

In the first embodiment, the determination of the driving cams performed when the engine is stopped is also performed when the engine is started. If it is determined that the large cams 16 are not completely prepared for all of the driving cams, valve closing timings of all intake valves are changed by driving the VVT 20 so that all of the cylinders have equal in-cylinder filling efficiency. FIG. 3 is a graph showing an example of a relationship between the valve closing timing of the intake valve IVC and the in-cylinder filling efficiency $\eta$. FIG. 3 is the graph assuming that all of the cylinders have equal intake pipe negative pressure and equal valve opening timing of the intake valve IVO.

FIG. 3 shows a characteristic curve of the in-cylinder filling efficiency $\eta$ that is substantially symmetrical with respect to a crank angle near an intake stroke bottom dead center BDC. The intake pipe negative pressure affects the fact that the crank angle at the symmetrical center does not match with the intake stroke bottom dead center. A difference in the operation angle between the small cam 14 and the large cam 16 has already been known in a design stage of the intake cams. Even if the small cams 14 and the large cams 16 are used as the driving cams, the valve closing timings IVC when the in-cylinder filling efficiencies $\eta$ become equal can be specified from the characteristic curve shown in FIG. 3. The intake pipe negative pressure affecting the characteristic shown in FIG. 3 is correlated with an engine speed and a throttle opening, and can be associated with them. Accordingly, if the engine speed and the throttle opening can be obtained, it is possible to specify the valve closing timings when the in-cylinder filling efficiencies r become equal, that is, a valve closing timing EIVC and a valve closing timing LIVC from FIG. 3.

FIG. 4 is a diagram illustrating an example of a combination of determination results of the driving cams and valve opening and closing timings of the intake valve when the engine is started. An upper column of FIG. 4 shows valve opening and closing timings of the intake valve when it is determined that all of the driving cams are the large cams, and the engine is normally started. As being understood from the upper column of FIG. 4, differences in valve opening and closing timings are not provided among the cylinders.

On the other hand, a lower column of FIG. 4 shows the valve opening and closing timings of the intake valves when it is determined that the large and small cams are used as the driving cams, and the engine is started. In the lower column of FIG. 4, the driving cams of the first cylinder #1 and the second cylinder #2 are switched to the large cams 16, whereas the driving cams of the third cylinder #3 and the fourth cylinder #4 are still the small cams 14. As being understood from the lower column of FIG. 4, all of the valve opening timings IVO of the intake valves are aligned when the large and small cams are used as the driving cams. When the large and small cams are used as the driving cams, the valve closing timings IVC of the intake valves of the first and second cylinders are set to an advanced side of the intake stroke bottom dead center BDC, whereas the valve closing timings NC of the intake valves of the third and fourth cylinders are set to a retard side of the intake stroke bottom dead center BDC. The degree of advance of the valve closing timing NC for the first and second cylinders and the degree of retard of the valve closing timing IVC for the third and fourth cylinders with respect to the intake stroke bottom dead center BDC are specified based on the characteristic shown in FIG. 3.

Figure 5:
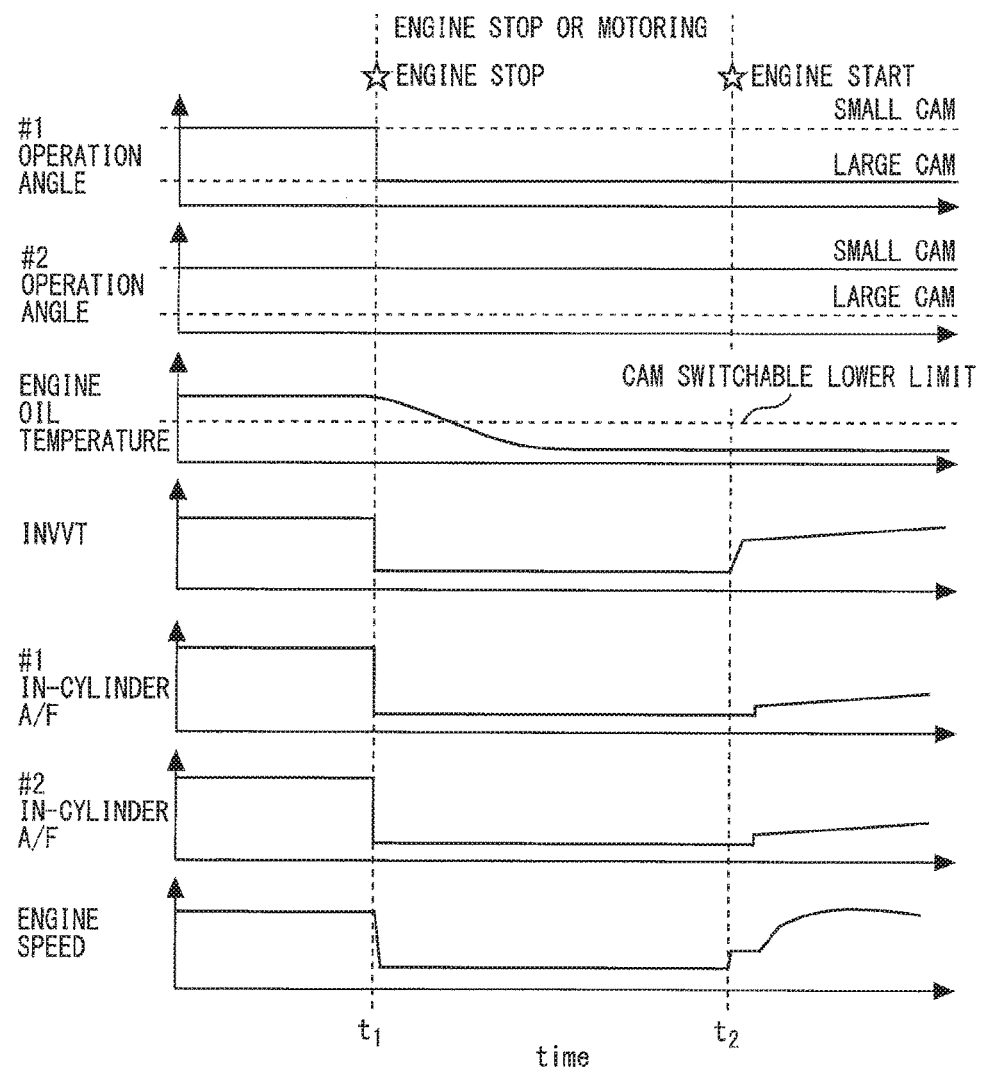
FIG. 5 is a time chart for describing control examples of the first embodiment of the present disclosure.

FIG. 5 is a time chart for describing control examples of the first embodiment of the present disclosure. In FIG. 5, an engine stop request is output at a time $t_1$, and an engine start request is output at a time $t_2$. The intake cams of the first cylinder #1 are switched to the large cams 16 at the time $t_1$. On the other hand, the intake cams of the second cylinder #2 are not switched to the large cams 16 during a period from the time $t_1$ to the time $t_2$, and are still the small cams 14. A state of the cam shaft during the period from the time $t_1$ to the time $t_2$ is not limited to particular states. That is, the cam shaft may be completely stopped during the period from the time $t_1$ to the time $t_2$, or may be rotated by inertia immediately after the time $t_1$ or motoring immediately before the time $t_2$.

As illustrated in FIG. 5, in the control in the first embodiment, the valve opening and closing timings of the intake valve INVVT are changed when it is determined at the time $t_2$ that the large and small cams are used as the driving cams. The change of the valve opening and closing timings of the intake valve INVVT are as described in FIGS. 3 and 4. That is, the valve opening timings of all the intake valves are aligned, and the valve closing timings are changed. When the valve opening and closing timings of the intake valve INVVT are changed, the first cylinder #1 and the second cylinder #2 have substantially equal in-cylinder filling efficiencies at the time $t_2$ and thereafter.

In the control in the first embodiment, a fuel injection amount of each cylinder at the time $t_2$ and thereafter is determined by a feedforward control assuming that the large cams 16 are completely prepared for all of the driving cams. Thus, the fuel injection amounts at the time $t_2$ and thereafter are set so as to equalize the fuel amounts injected into the first cylinder #1 and the second cylinder #2. As illustrated in FIG. 5, the first cylinder #1 and the second cylinder #2 have equal in-cylinder air-fuel ratio A/F at the time $t_2$ and thereafter. There is almost no difference in in-cylinder air-fuel ratio A/F between the first cylinder #1 and the second cylinder #2. According to the control in the first embodiment, the in-cylinder air-fuel ratio A/F of the second cylinder #2 can be prevented from being deviated from the target air-fuel ratio at the time $t_2$ and thereafter.

The in-cylinder air-fuel ratios A/F of the first cylinder #1 and the second cylinder #2 fall within an air-fuel ratio range in which the engine can be started, and thereby the engine can be appropriately started.

If it is possible to grasp immediately before the time $t_2$ that the large and small cams are used as the driving cams and thereby the cam shaft can be rotated by motoring immediately before the time $t_2$, the driving cams can be switched during the motoring.

However, as illustrated in FIG. 5, if an engine oil temperature is below a lower limit value during the period from the time $t_1$ to the time $t_2$, the driving cams cannot be substantially switched. In this regard, according to the control of the first embodiment, the engine can be appropriately started regardless of the engine oil temperature. Note that in FIG. 5, the valve opening and closing timings of the intake valves shows an upward trend at the time $t_2$ and thereafter. It means that the intake stroke negative pressure is changed as the engine speed is increased at the time $t_2$ and thereafter, and the valve closing timing of the intake valve that meets the characteristic shown in FIG. 3 is changed every moment.

Figure 6:
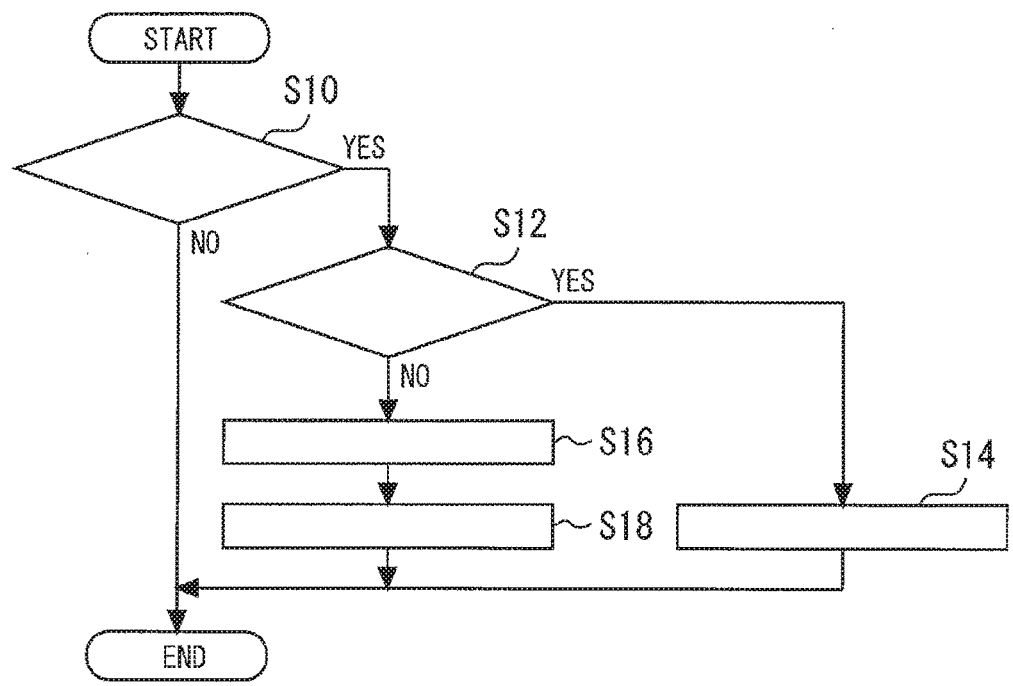
FIG. 6 is a flowchart illustrating an example of a process routine performed by an ECU 40 in the first embodiment of the present disclosure.

FIG. 6 is a flowchart illustrating an example of a process routine performed by the ECU 40 in the first embodiment of the present disclosure. This routine is performed in every control period (for example, in every combustion cycle of the cylinder included in the engine).

In the routine illustrated in FIG. 6, firstly, it is determined whether it is the engine starting time (step S10). Whether it is the engine starting time is determined based on whether the ECU 40 receives an IG signal from the ignition key 46, for example. The IG signal is output when a driver of a vehicle performed a predetermined operation (for example, an operation of turning the ignition key 46 to a predetermined position, or the like). When it is determined in step S10 that it is not the engine starting time, the routine is ended.

When it is determined in step S10 that it is the engine starting time, it is determined whether starting cams are prepared for all of the driving cams (step S12). The "starting cam" called in step S12 means the large cam 16. Whether the driving cams are switched to the starting cams can be determined by the presence or absence of induced voltage generated when a pin is returned to the solenoid 28, for example. More particularly, the ECU 40 records the presence or absence of the induced voltage generated in the control (cam switching control) performed when the engine was stopped for the last time before the engine is started this time, and it is determined using the result whether the driving cams are switched to the starting cams.

When it is determined in step S12 that the starting cams are completely prepared for all of the driving cams, the engine is normally started (step S14). In the normal engine start in step S14, the intake valves are driven without providing the differences in valve opening and closing timings among the cylinders (see the upper column of FIG. 4).

In the normal engine start, the fuel injection amount and the ignition timing are determined by the feedforward control assuming that the large cams 16 are completely prepared for all of the driving cams, and thereby fuel injection valves and an ignition device for each cylinder are driven. On the other hand, when it is determined in step S12, that the starting cams are not completely prepared for all of the driving cams, the valve opening and closing timings of the intake valve INVVT are adjusted (step S16), and then the engine is started by using the large and small cams (step S18). In the adjustment in step S16, the valve opening timings of all intake valves are aligned, and the valve closing timings are changed (see the lower column of FIG. 4). In starting the engine using the large and small cams in step S18, the intake valves are driven by the valve opening and closing timings INVVT adjusted in step S16. In starting the engine using the large and small cams, as in the normal engine start, the fuel injection amount and the ignition timing are determined by the feedforward control assuming that the large cams 16 are completely prepared for all of the driving cams, and thereby the fuel injection valves and the ignition device for each cylinder are driven.

The processes in steps S16 and S18 are performed not only when the determination result in step S12 is negative but also when the determination result is unclear for any reason. When the above-described recording of the induced voltage is failed, for example, the determination result in step S12 is regarded as unclear. This includes not only when the large cams 16 and the small cams 14 are used as the driving cams but also when all of the driving cams are still the small cams 14. Furthermore, this includes when the large cams 16 are completely prepared for all of the driving cams.

According to the routine illustrated in FIG. 6, when it is determined that the large cams 16 are not completely prepared for all of the driving cams in starting the engine, the engine can be started by using the large and small cams. Accordingly, even when the large cams 16 and the small cams 14 are used as the driving cams, the in-cylinder air-fuel ratio of the cylinder in which the driving cams are still the small cams 14 can be prevented from being deviated from the target air-fuel ratio. The in-cylinder air-fuel ratio of the cylinder in which the driving cams are switched to the large cams and the in-cylinder air-fuel ratio of the cylinder in which the driving cams are still the small cams 14 fall within the air-fuel ratio range in which the engine can be started, and thereby the engine can be appropriately started.

In the first embodiment described above, the ECU 40 performs the processes in steps S16 and S18 in FIG. 6, and the "engine start control" of the above-described first aspect of the present disclosure is achieved.

In the first embodiment described above, the VVT 20 corresponds to a "rotational phase change mechanism" in the above-described second aspect of the present disclosure.

Second Embodiment

Next, a second embodiment of the present disclosure will be described with reference to FIGS. 7 and 8.

Note that a configuration example of a system in the second embodiment is common to the configuration example illustrated in FIG. 1. The switching operation of the driving cam is as described in FIG. 2. Therefore, the descriptions about the system configuration example and the switching of the driving cam are omitted.

[Characteristic of Control in Second Embodiment]

In the first embodiment described above, when the large cams 16 are not completely prepared for all of the driving cams, the valve opening and closing timings of the intake valves are changed so that all of the cylinders have equal in-cylinder filling efficiency, assuming that all of the cylinders have equal fuel injection amount when the engine is started. In the second embodiment, the fuel injection amount of each cylinder is changed assuming that the in-cylinder filling efficiencies are different among cylinders when the large cams 16 are not completely prepared for all of the driving cams.

Figure 7:
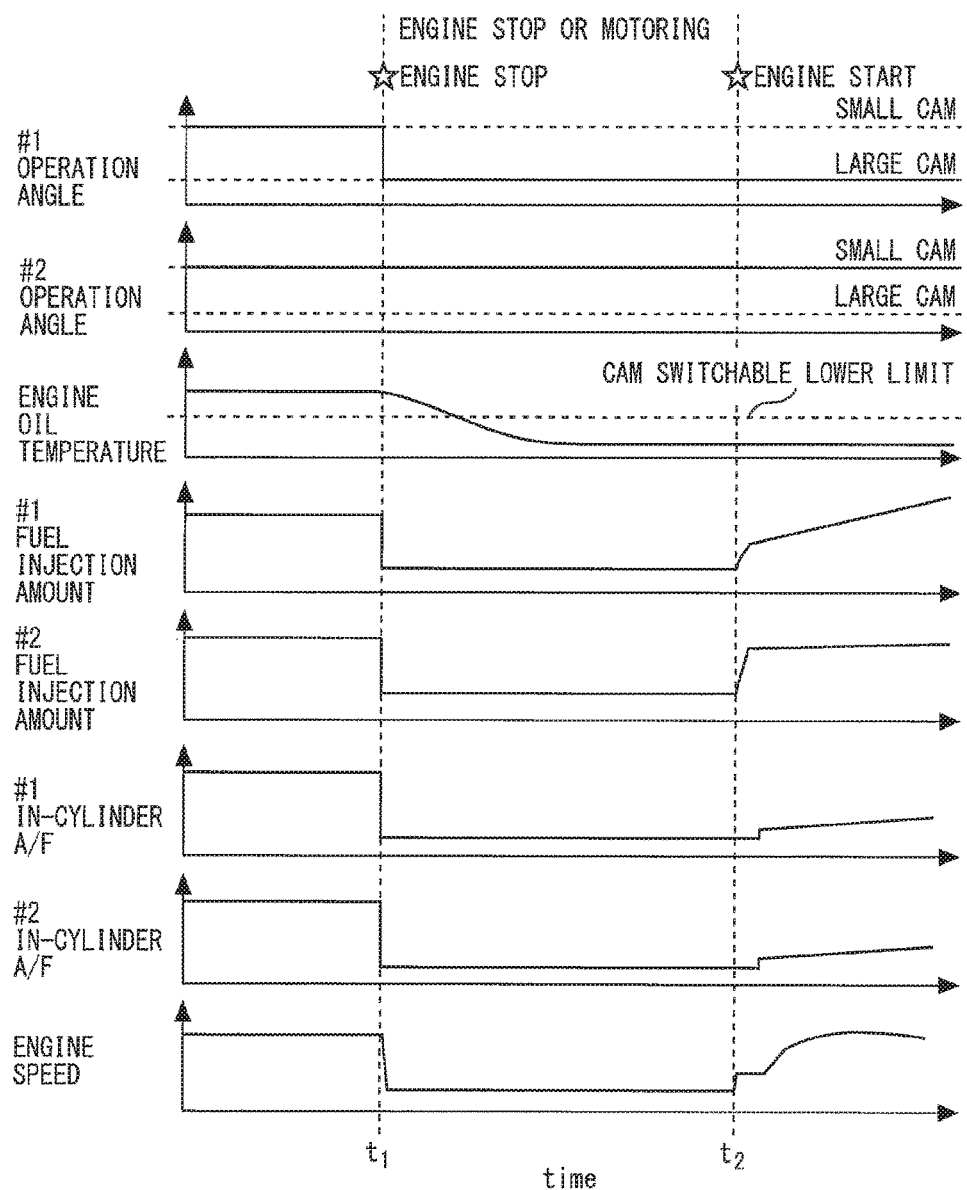
FIG. 7 is a time chart for describing control examples of a second embodiment of the present disclosure.

FIG. 7 is a time chart for describing control examples of the second embodiment of the present disclosure. A time $t_1$ and a time $t_2$ in FIG. 7 are the same as those in FIG. 5. That is, in FIG. 7, an engine stop request is output at a time $t_1$, and an engine start request is output at a time $t_2$. The intake cams of the first cylinder #1 are switched to the large cams 16 at the time $t_1$. On the other hand, the intake cams of the second cylinder #2 are not switched to the large cams 16 during a period from the time $t_1$ to the time $t_2$, and are still the small cams 14.

As illustrated in FIG. 7, in the control in the second embodiment, the fuel injection amount at the time $t_2$ and thereafter is set to different values between the first cylinder #1 and the second cylinder #2 when it is determined at the time $t_2$ that the large and small cams are used as the driving cams. The fuel injection amounts of the first and second cylinders are calculated by estimating the intake air amount of each cylinder. The intake air amount of each cylinder is estimated based on the characteristic described in FIG. 3 and the intake stroke negative pressure affecting the characteristic, for example. Note that as illustrated in FIG. 7, the driving cams are completely switched to the large cams 16 in the first cylinder #1. Therefore, in the first cylinder, the estimation of the intake air amount is omitted, and the fuel injection amount may be determined based on the feedforward control described in the above-described first embodiment.

When the fuel injection amount is set to different values between the first cylinder #1 and the second cylinder #2, the first cylinder #1 and the second cylinder #2 have substantially equal in-cylinder air-fuel ratio A/F at the time $t_2$ and thereafter. Thus, according to the control in the second embodiment, the in-cylinder air-fuel ratios A/F of the first cylinder #1 and the second cylinder #2 at the time $t_2$ and thereafter can be brought close to the target air-fuel ratio. Accordingly, the in-cylinder air-fuel ratios A/F of the first cylinder #1 and the second cylinder #2 fall within the air-fuel ratio range in which the engine can be started, and thereby the engine can be appropriately started.

Figure 8:
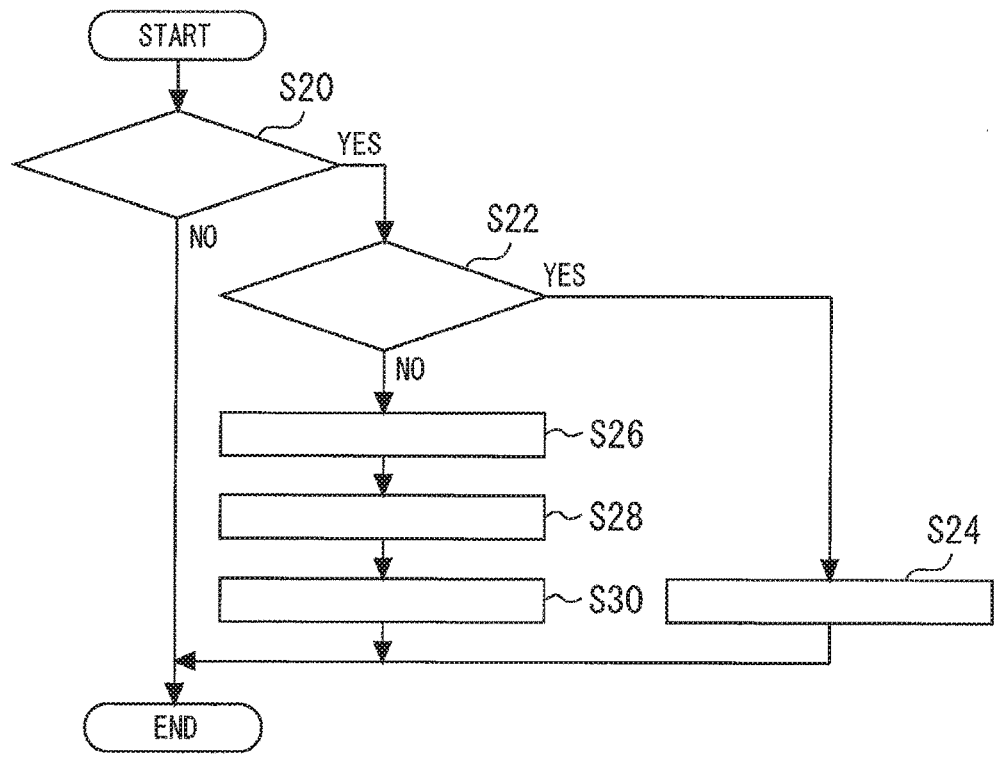
FIG. 8 is a flowchart illustrating an example of a process routine performed by the ECU 40 in the second embodiment of the present disclosure.

FIG. 8 is a flowchart illustrating an example of a process routine performed by the ECU 40 in the second embodiment of the present disclosure. This routine is performed in every control period (for example, in every combustion cycle of the cylinder included in the engine).

In the routine illustrated in FIG. 8, the processes in steps S20 and S22 are performed. The processes in steps S20 and S22 are the same as those in step S10 and S12 in FIG. 6. In the routine illustrated in FIG. 8, the engine is normally started when it is determined in step S22 the starting cams are completely prepared for all of the driving cams (step S24). The process in step 24 is the same as that in step S14 in FIG. 6.

When it is determined in step S22 that the starting cams are not completely prepared for all of the driving cams, it is determined whether the driving cams are the small cams 14 or the large cams 16 (step S26). For example, the determination in step S26 is performed by using the output from a sensor separately provided in the vicinity of the solenoid 28.

Subsequently to step S26, the fuel injection amount is calculated for each cylinder (step S28), the engine is started by using the large and small cams (step S30). The calculation in step S28 is performed by estimating the intake air amount of each cylinder based on the determination result of step S26, as described above. In starting the engine using the large and small cams in step S30, the fuel injection valve of each cylinder is driven based on the fuel injection amount calculated in step S28. In starting the engine using the large and small cams, the ignition device of each cylinder is driven based on the ignition timing according to the fuel injection amount. Note that in starting the engine using the large and small cams in step S30, the intake valves are driven as in the normal engine start.

The processes in steps S26 to S30 are performed not only when the determination result in step S22 is negative but also when the determination result is unclear for any reason as in the first embodiment.

According to the routine illustrated in FIG. 8, when it is determined that the large cams 16 are not completely prepared for all of the driving cams in starting the engine, the engine can be started by using the large and small cams. Accordingly, even when the large cams 16 and the small cams 14 are used as the driving cams, the in-cylinder air-fuel ratios of all the cylinder fall within the air-fuel ratio range in which the engine can be started, and thereby the engine can be appropriately started.

In the second embodiment described above, the ECU 40 performs the processes in steps S26 to S30 in FIG. 8, and the "control in starting the engine" of the above-described first aspect of the present disclosure is achieved.

Other Embodiments

In the above described first and second embodiments, FIG. 1 illustrates an example in which four cam carriers 12 are arranged around the cam shaft 10 of the inline four-cylinder engine, that is, the cam carriers 12 are arranged for each cylinder. However, the cam carrier 12 may be arranged across two or more cylinders. Such an arrangement example is disclosed in JP 2009-228543 A.

The above described first and second embodiments describe an example in which a change to a starting profile is performed by switching between the intake cams 14 and 16. However, the change to the starting profile may be performed by adjusting a posture and a shape of a single intake cam instead of the intake cams 14 and 16. An example of such single intake cam is disclosed in JP 2010-168966 A.

If the change to the starting profile is performed for each cylinder or each cylinder group, not for all of the cylinders even when any configuration is adopted for the intake cam, the engine start-up performance can be improved by applying the control in the above-described first or second embodiment.

What is claimed is:

1. A control device for controlling an internal combustion engine, the engine comprises multiple cylinder and intake cams which are provided for each cylinder and also configured to drive an intake valve of each cylinder by changing at least one of a lift amount and an operation angle of a cam profile of each intake cam,
wherein the control device is configured to:
when the engine is started, determine whether the cam profiles of all the intake cams are switched to a suitable cam profile for starting the engine; and
when it is determined that the cam profiles of all the intake cams are not switched to the suitable profile for starting the engine, perform an engine start control in which an in-cylinder air amount or a fuel injection amount is adjusted so that in-cylinder air-fuel ratios of all the cylinders are equalized.

2. The control device for an internal combustion engine according to claim 1,
wherein the engine further comprises a cam shaft which is configured to support the intake cams and a rotational phase change mechanism which is configured to change a rotational phase of the cam shaft with respect to a crankshaft, and
wherein the engine start control is a control in which fuel injection amounts of all the cylinders are set to be equal values whereas the rotational phase change mechanism is operated to adjust in-cylinder air amount of all the cylinders so that in-cylinder filling efficiencies of all the cylinders are equalized.

3. The control device for an internal combustion engine according to claim 1,
wherein the engine start control is a control in which the in-cylinder air amounts of all the cylinders are estimated and the fuel injection amounts of all the cylinders are adjusted based on the estimated in-cylinder air amounts.

* * * * *